(12) United States Patent
StJohns et al.

(10) Patent No.: US 9,542,713 B2
(45) Date of Patent: Jan. 10, 2017

(54) SYSTEMS AND METHODS FOR SECURING THE MANUFACTURING SUPPLY CHAIN

(75) Inventors: Michael C. StJohns, Germantown, MD (US); Robert G. Boehm, Jr., Portland, OR (US); Aditi Hilbert, Redwood City, CA (US)

(73) Assignee: SILVER SPRING NETWORKS, INC., San Jose, CA (US)

( * ) Notice: Subject to any disclaimer, the term of this patent is extended or adjusted under 35 U.S.C. 154(b) by 0 days.

(21) Appl. No.: 14/343,805

(22) PCT Filed: Sep. 9, 2012

(86) PCT No.: PCT/US2012/054236
§ 371 (c)(1),
(2), (4) Date: Mar. 7, 2014

(87) PCT Pub. No.: WO2013/036816
PCT Pub. Date: Mar. 14, 2013

(65) Prior Publication Data
US 2014/0229384 A1     Aug. 14, 2014

Related U.S. Application Data

(60) Provisional application No. 61/532,240, filed on Sep. 8, 2011.

(51) Int. Cl.
| G06Q 50/00 | (2012.01) |
| G06Q 50/04 | (2012.01) |
| H04L 9/32  | (2006.01) |
| G06Q 10/00 | (2012.01) |

(52) U.S. Cl.
CPC .............. *G06Q 50/04* (2013.01); *G06Q 10/00* (2013.01); *H04L 9/3268* (2013.01); *Y02P 90/30* (2015.11)

(58) Field of Classification Search
USPC ....................................... 705/67, 14
See application file for complete search history.

(56) References Cited

U.S. PATENT DOCUMENTS

| 6,892,302 B2 * | 5/2005 | Wheeler ................ G06F 21/32 380/282 |
| 7,207,060 B2 * | 4/2007 | Immonen ............... G06Q 20/04 713/173 |
| 7,769,690 B2 * | 8/2010 | Dare ................... G06F 21/6245 705/50 |
| 2003/0115466 A1 * | 6/2003 | Aull ..................... G06Q 20/341 713/172 |
| 2005/0200880 A1 * | 9/2005 | Oshiumi .............. G06F 3/1222 358/1.14 |

(Continued)

OTHER PUBLICATIONS

International Search Report issued in PCT/US2012/054236 on Jan. 21, 2013.

*Primary Examiner* — El Mehdi Oussir
(74) *Attorney, Agent, or Firm* — Artegis Law Group, LLP

(57) ABSTRACT

Securing the manufacturing supply chain with digital certificates. A token is coupled to a manufacturing station and enabled via a personal identification number. The token includes a counter limiting the maximum number of certificates to be signed, and compares a serial number of a digital certificate to a tracked serial number. In some embodiments, the token is linked to a particular manufacturing station once the token is enabled.

10 Claims, 6 Drawing Sheets

(56) References Cited

U.S. PATENT DOCUMENTS

2011/0173684 A1* 7/2011 Hurry .................... G06F 21/33
                                                        726/6
2016/0021098 A1* 1/2016 Dhanabalan ........ H04L 63/0823
                                                        726/8

* cited by examiner

SYSTEMS AND METHODS FOR SECURING THE MANUFACTURING SUPPLY CHAIN

RELATED APPLICATIONS

The present application claims the benefit of prior-filed U.S. Provisional Patent Application No. 61/532,240, filed on Sep. 8, 2011, the entire content of which is hereby incorporated by reference.

BACKGROUND

The invention relates to securing a manufacturing supply chain where devices are manufactured with digital identities attested to by digital certificates. Specifically, the invention relates to systems and methods for digitally signing digital certificates such that devices manufactured without proper authority can be identified and deactivated.

Public Key Infrastructure (PKI) is a system for cryptographically binding a public key pair to an object identity (e.g., a person, a software module, an electronic device). Possession of the private key portion of the key pair is used to prove ownership of the identity. In PKI digital certificates are issued to the object and checked prior to allowing the object to operate. In the most usual embodiment of PKI, a certificate authority (CA) binds a public key to the object through a registration and issuance process (i.e., signing of the digital certificate by the CA's credentials). If such a CA should become compromised (e.g., loss or theft of the CA's credentials), PKI systems usually revoke the certificate for the CA, invalidating all digital certificates signed by the CA. In a PKI designed for a manufacturing supply chain, such an action could invalidate millions of already manufactured and sold devices, even if they were legitimately manufactured. The invention relates to approaches to mitigate these issues.

Intellectual property owners who use contract manufacturers to produce devices or who license their technology to other manufacturers use PKI to ensure that devices are not manufactured without proper reimbursement to the intellectual property owner. For example, providers of network interface cards (NIC) use PKI to digitally sign NIC certificates during manufacture. Once deployed into the field, the digital certificates of the NICs are verified before the NIC is able to communicate with other NICs. If NICs are manufactured without authority (e.g., a CA is stolen, NICs are manufactured at times the plant is supposed to be closed, i.e., "midnight manufacturing"), one mechanism for recovery is to revoke the CA certificate in lieu of revoking the individual NIC certificates. This can result in a large number of NICs being invalidated, even if they were manufactured prior to the CA being compromised, and are thus valid NICs. Replacement of the NICs or of the NICs certificates can be very expensive and may not even be possible.

SUMMARY

The invention provides an alternative approach allowing for the secure identification and revocation of a known range of devices, rather than to a larger universe of devices. Thus, for example, this may mitigate problems such as "midnight manufacturing" or unauthorized production of devices. For example, it may (i) limit the number of certificates it can issue to devices as well as (ii) provide a secure auditable record of the number of certificates actually issued, thereby limiting the size of the possible problem and providing the means to detect such compromises and associated non-repudiation services.

Thus, for example, the issuing device may be constrained by specific policy logic to ensure that each device certificate contains an indication that is part of a monotonically-increasing sequence (among the indications that are contained in sequentially-issued device certificates). The indication may be provided, for example, in a specific location within the signed portion of the certificate. In some embodiments, deterministic sequences other than monotonically increasing sequences are used.

The issuing device may be, for example, a smart card or other hardware security module. The policy logic may be written in Java, C or other computer programming languages. The issued certificates may be X.509, Card Verifiable Certificates, or other digital certificate formats. The issuing device may have limits set by the issuing authority as to the total number of certificates it can issue. Further, the issuing device may have a transport PIN or password set by the issuing authority to protect the issuing device while in transit. Upon first insertion within or first connection to a specific issuing station, the issuing device may be configured to lock itself to that station through interaction with the station's Trusted Platform Module or other security module physically integrated into the issuing station. Once locked to an issuing station, the issuing device refuses to issue device certificates while removed from that station.

The issuing device changes (e.g., increments) an internal counter representing the next expected sequence number after each certificate signature. (For example, other deterministic sequencing may be employed, other than a monotonically increasing sequence of integers.) The issuing device refuses to sign any certificate unless the appropriate expected sequence number is in the appropriate place of the to-be-signed certificate data and has the value expected by the issuing device. In this way, ranges of "bad" devices can be disabled by revoking certificates signed while the issuing device may have been lost, stolen or operated out of policy (e.g. midnight manufacturing). A revocation may consist of either a range of "known-good" or "known-bad" sequence numbers where one of the bounds may be zero or infinity.

As a result, by differentiating between parts of the sequence, differentiation may be made between validly and invalidly signed certificates, where the secured sequence number may be used to define an epoch between valid and invalid device certificates.

In one embodiment, the invention provides a method of signing digital certificates. The method includes coupling a token to a manufacturing station, enabling the token, comparing a counter of the number of digital certificates signed to a maximum value, obtaining a public key from the electronic device to be manufactured, creating a to-be-signed digital certificate incorporating that public key, comparing a serial number of the digital certificate to a serial number in a serial number tracker in the token, signing the digital certificate when the serial number of the digital certificate matches the serial number in the serial number tracker, modifying the serial number in the serial number tracker to the next serial number expected, incrementing the counter following the signing of the digital certificate, and returning the signed digital certificate to the electronic device. The digital certificate is not signed when the counter exceeds the maximum value or the serial number of the digital certificate does not match the serial number in the serial number tracker. In addition, the counter is not incremented and the serial number in the serial number tracker is not modified if the digital certificate is not signed.

In another embodiment the invention provides a system for signing digital certificates of a plurality of electronic devices during manufacturing which limits the use of devices manufactured without proper authority. The system includes a token and a manufacturing station. The token includes a counter, a predetermined personal identification number, and a pre-determined maximum value for the counter. The manufacturing station includes a trusted platform module, a token interface, and an electronic device link. The token is coupled to the manufacturing station via the token interface. The manufacturing station receives a public key from an electronic device via the electronic device link and prepares a digital certificate for signature. The manufacturing station uses the token to sign the digital certificate when each of the token is enabled, the counter is less than the pre-determined maximum value, and serial number of the digital certificate matches a serial number in the serial number tracker. The manufacturing station uses the electronic device link to place the digital certificate on the electronic device.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
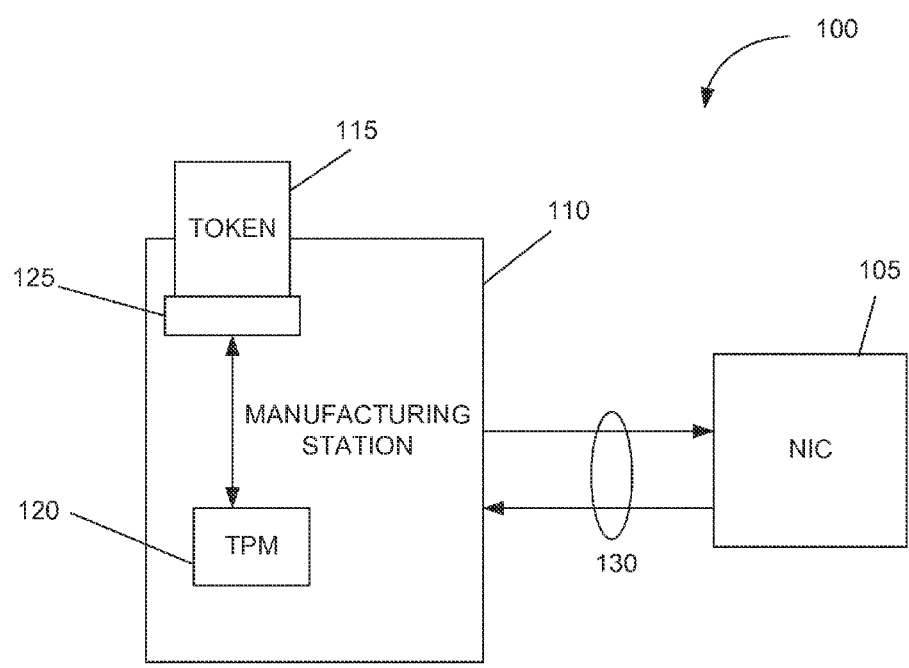
FIG. 1 is a block diagram of an embodiment of a system for signing digital certificates.
Figure 2:
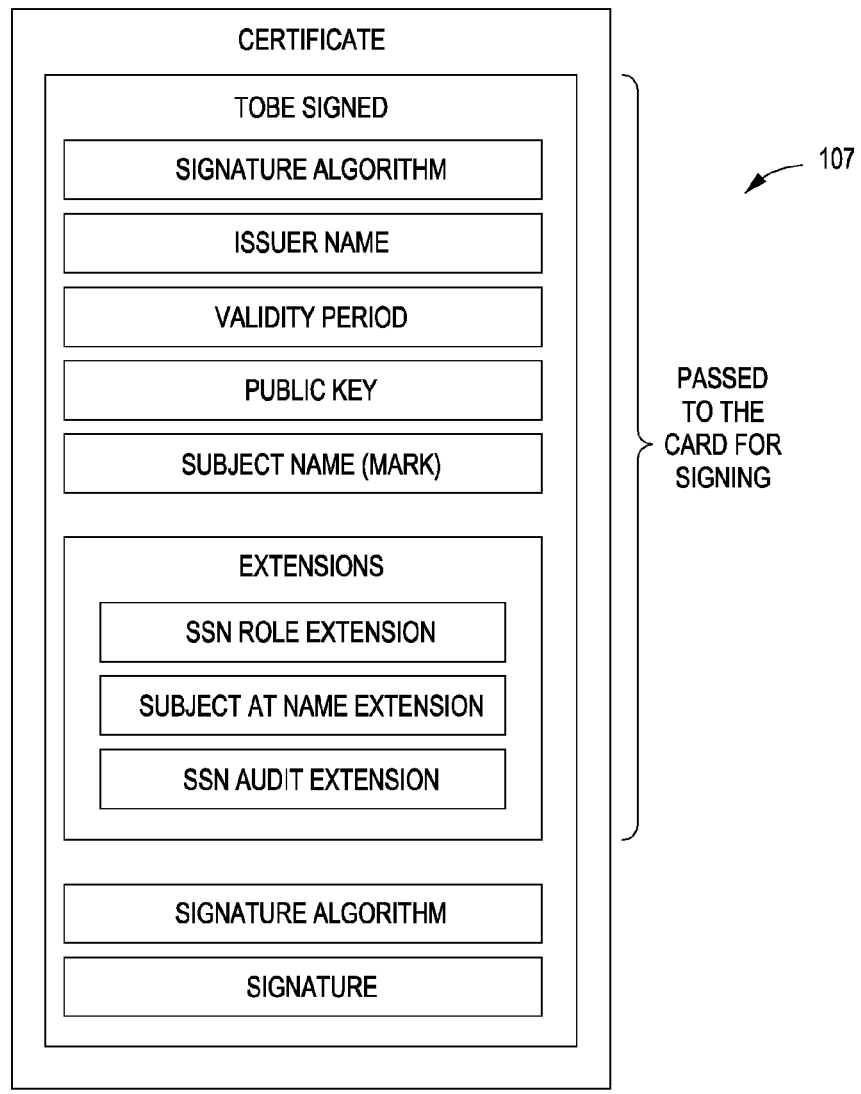
FIG. 2 is an embodiment of a digital certificate.

FIG. 1 shows an embodiment of a system 100 for signing digital certificates of devices 105 (e.g., network interface cards (NIC)) during manufacturer of the devices 105. An embodiment of a digital certificate 107 is shown in FIG. 2. The system 100 includes a manufacturing station 110, and a token 115. The manufacturing station 110 includes a host-specific trusted platform module 120 (TPM) and an interface 125 for coupling the manufacturing station 110 to the token 115. The manufacturing station 110 also includes a link 130 for receiving an unsigned public key from the devices 105 and sending a signed digital certificate back to the devices 105.

The TPM 120 allows token 115 to securely identify manufacturing station 110 and enable itself (token 115) to sign the digital certificates of the devices 105. A manufacturing station 110 will be prevented from signing the digital certificates if the TPM 120 is not valid or if there is no valid token 115 coupled to the manufacturing station 110, or if the TPM 120 public key cannot be verified by the token 115. The interface 125 can be a connector for receiving a smart card token 115, a radio frequency identification (RFID) reader (i.e., where the token 115 is an RFID card), or other suitable interface. The link 130 can be a wired or a wireless (e.g., WiFi, Bluetooth, etc.) link.

In one embodiment, a Javacard token 115 is used, and includes the use of Extended Length application protocol data units (APDUs). To prevent unauthorized (e.g., "midnight") manufacturing, the token 115 limits the number of certificates it can issue to devices, and provides a secure auditable record of the number of certificates actually issued. At the time the token 115 is provisioned (i.e., issued by an issuing authority such as an owner of intellectual property included in the devices 105 to be manufactured), the provisioning entity initializes the token 115 with a limit indicating the maximum number of certificates that can be issued. The token 115 is then able to generate that many certificates and no more. The token 115 also has a mechanism to provide a signed object indicating the number of signatures the token 115 has created (e.g., to the manufacturing station 110 or a remote device).

As part of the signature process for the certificate, the token 115 verifies that a specific portion of the data to be signed (in this embodiment, the last X509 v3 extension) contains a current signature count as well as a unique identification number (UID) unique to the token 115. The UID is retrieved from the token 115 prior to signature. If the token 115 is stolen, the verification logic in the devices 105 and other entities are programmed to ignore all devices 105 with signature counts in their certificates later in sequence than the last audited known good value for that specific UID.

The Javacard Applet wraps a collection of objects for use by the manufacturing station 110 in issuing the device certificates, and contains one or more of:

A key pair used for signing device certificates and for signing audit data blobs. That key pair is generated on the token 115 at personalization time (i.e., when the token 115 is made active).

A signing counter of the number of times that the signing key pair has been used to sign certificates.

The maximum allowed value for the signing counter.

A mechanism for generating random numbers for use as a nonce.

An applet certificate chain containing at least the applet's manufacturing station 110 signing public key. The certificate is created during personalization by a back office or issuance tool. The chain may contain other certificates if necessary to chain back to the owner's root.

An enable personal identification number (PIN) is required to be entered once at the manufacturing station 110 to enable the token 115. This is used to protect the token 115 during transport from the owner to the manufacturer. Operationally, the PIN should be sent to the manufacturer separately from the token 115.

A verification private key common to all instances of the applet used to verify certificate requests come from an on-card entity.

The TPM 120 public key once the token 115 and TPM 120 are linked.

In some embodiments, serial numbers are used to partition devices into an ordered group of good devices versus bad devices. Serial numbers are able to serve this function as serial numbers are generally already included in certificates for identification purposes. The serial number issuance is tied to a hardware security module that prevents the serial number from being tampered (i.e., the certificate will not be issued if the serial number is not as expected). In the event of a compromise, a "known bad" entry and "last known good" entry may be added to the device 105 firmware, so that the device 105 knows which serial numbers are acceptable for use. The known bad and last known good entries can be determined by examining audit blobs and logs which are described below.

Figure 3:
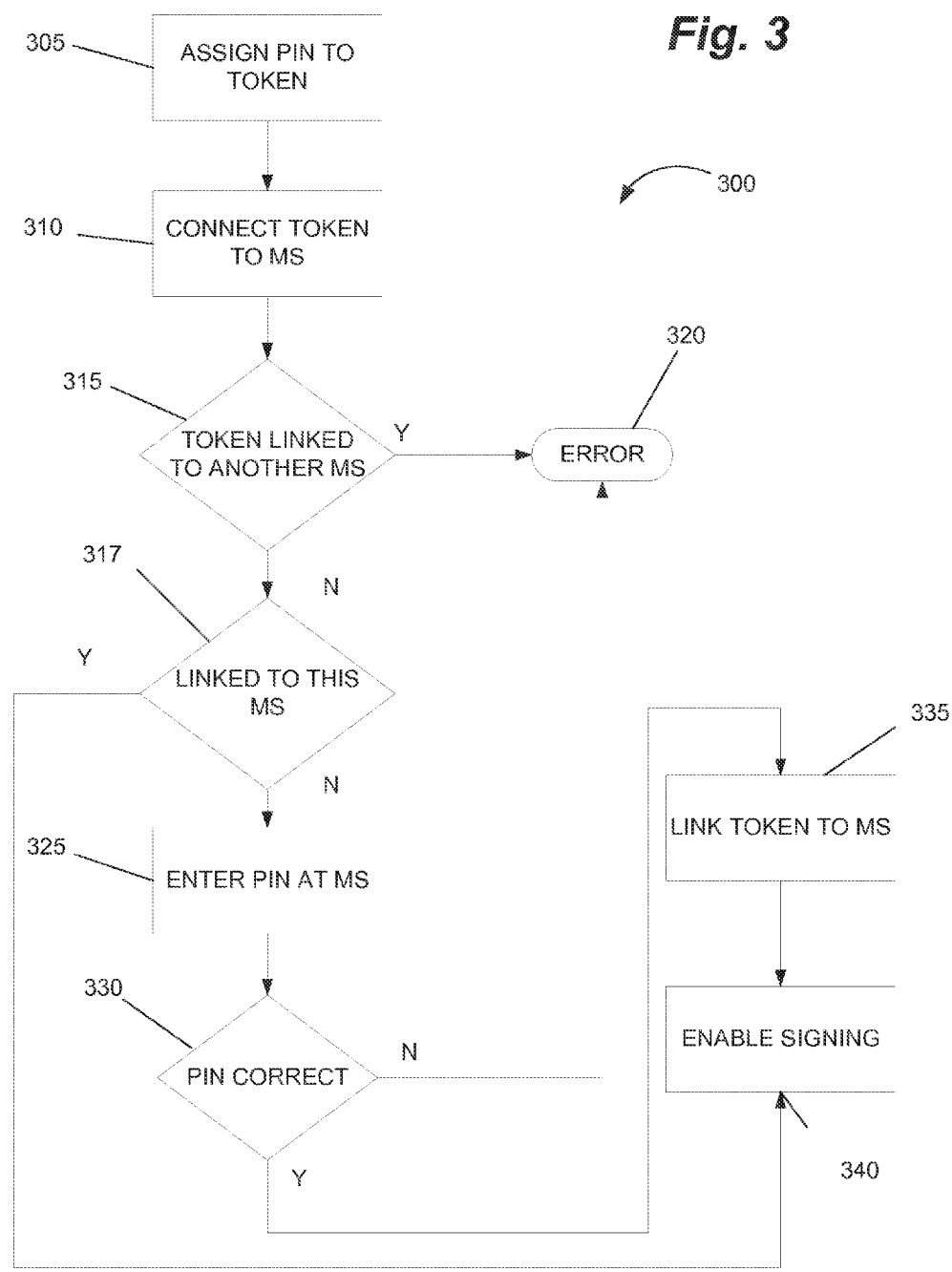
FIG. 3 is a flow chart of an embodiment of a process for enabling a token for signing digital certificates.

FIG. 3 shows an embodiment of a process 300 for enabling a manufacturing station 110 to sign digital certificates of devices 105. The devices 105 may be manufactured by a third-party (i.e., an issuing authority) for an owner of the devices 105 or may be manufactured by the owner itself. The owner may want to control manufacture of the devices 105 since the devices 105 may include proprietary information or may be a component of a proprietary system. The owner (or an issuing authority authorized by the owner) assigns a PIN to each token 115 (step 305). In addition, a key pair is generated on the token, and the token public key is bound to the digital certificates. The token 115 is then provided to the manufacturer, where the token 115 is coupled to a manufacturing station 110 (step 310).

In the embodiment shown in FIG. 3, the manufacturing station 110 determines whether the token 115 has been used on another manufacturing station 110 (step 315). This step prevents a token 115 from being stolen and used by on an unauthorized manufacturing station 110, or used by itself to sign certificates. If the token 115 has been used on another manufacturing station 110, an error is determined (step 320) and the token 115 is disabled or at least the manufacturing station 110 is prevented from signing digital certificates of the devices 105 using the token 115. In some embodiments, the token 115 determines if the manufacturing station 110 to which the token 115 is linked is correct (step 317), and prevents the manufacturing station 110 from signing certificates if the manufacturing station 110 is different from the manufacturing station 110 to which the token 115 is linked. This is accomplished by the token 115 issuing a challenge. The TPM 120 signs the challenge, and the token 115 verifies the signature over the challenge. If the signature is verified, the token 115 is linked to the correct station 110 (i.e., the station 110 having the correct TPM 120).

If the token 115 has not been used at another manufacturing station 110, the PIN assigned to the token 115 in step 305 is entered (e.g., on the manufacturing station 110) (step 325). The PIN is provided to the manufacturer by the owner (or issuing authority), and should be provided separate from the token 115 (e.g., via email). If the entered PIN is incorrect (i.e., does not match the PIN assigned to the token 115) (step 330), an error is determined (step 320) and the token 115 is disabled or at least the manufacturing station 110 is prevented from signing digital certificates of the devices 105 using the token 115. In some embodiments, the manufacturer is allowed multiple attempts (e.g., three) to enter a correct PIN before the token 115 is permanently disabled.

In the embodiment shown, once a correct PIN is entered, the token 115 is linked to the manufacturing station 110 to which it is coupled (step 335). For example, a public key from the TPM 120 identifying the particular manufacturing station 110 can be saved in a non-volatile memory on the token 115. The manufacturing station 110 is then able to sign digital certificates (subject to restrictions of the system, e.g., a limit to the number of certificates that can be signed) of devices 105 so long as the token 115 remains coupled to the manufacturing station 110 (step 340).

Figure 4:
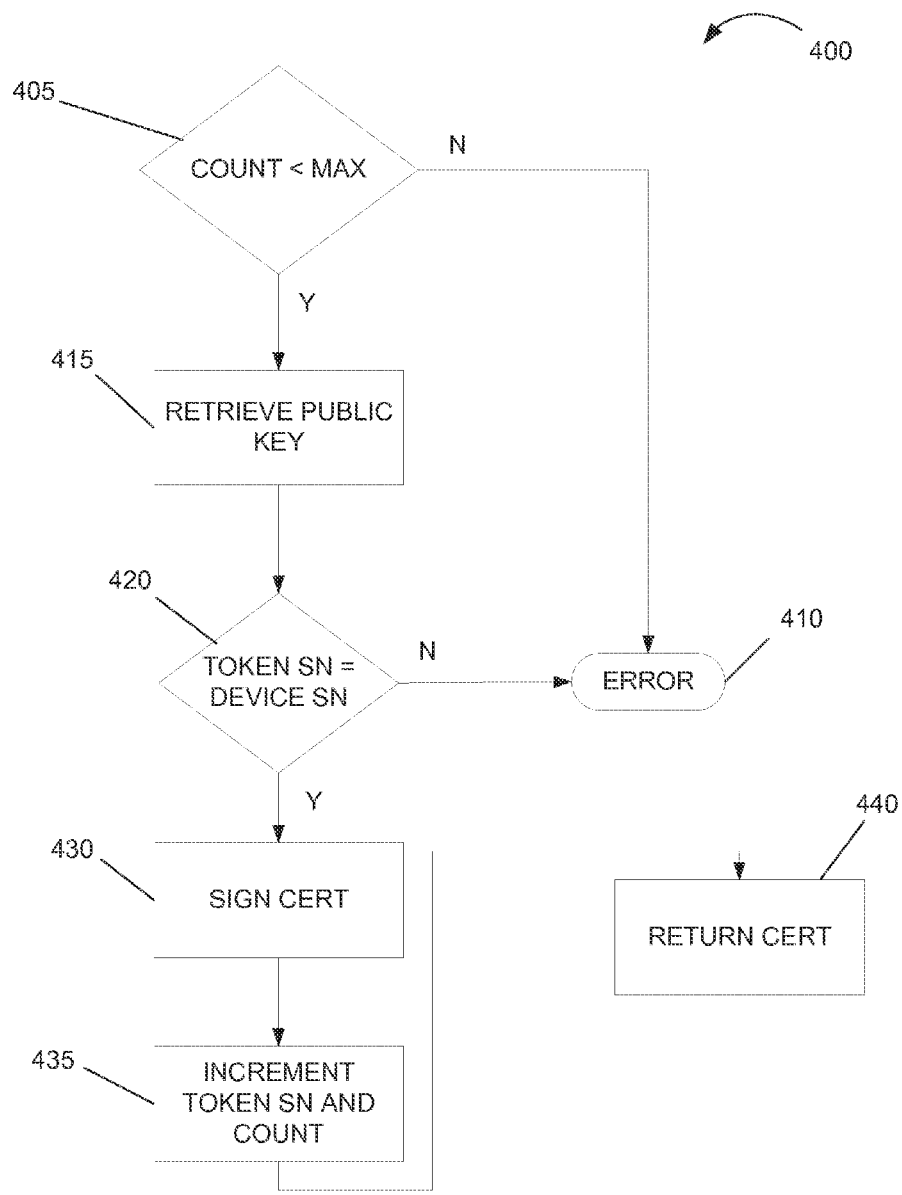
FIG. 4 is a flow chart of an embodiment of a process for signing digital certificates.

FIG. 4 shows an embodiment of a process 400 for signing digital certificates of devices 105. The manufacturing station 110 checks a count of the number of certificates already signed using a token 115 against a maximum number of certificates allowed to be signed by the token 115 (step 405). If the number of certificates already signed is equal to or greater than the maximum, an error is flagged (step 410), preventing further certificates from being signed until the token 115 is recharged or a new token 115 is coupled to the manufacturing station 110.

If the quantity of certificates signed using the token 115 is less than the maximum allowed, the manufacturing station 110 obtains a public key from the device 105 (step 415). In the embodiment shown, a serial number included in the certificate in an audit extension is compared with a serial number maintained by the manufacturing station 110 (e.g., the serial numbers can be sequential) (step 420). If the serial numbers do not match, an error is flagged (step 410) and the certificate is not signed.

If the serial numbers do match, a certificate is generated by the manufacturing station 110 (step 430). Next, the serial number in the manufacturing station 110 is modified (e.g., incremented), and the count of certificates signed by the token 115 (e.g., a log) is incremented (step 435). The signed certificate, with the embedded audit extension, is then returned to the device 105 (step 440).

Figure 5:
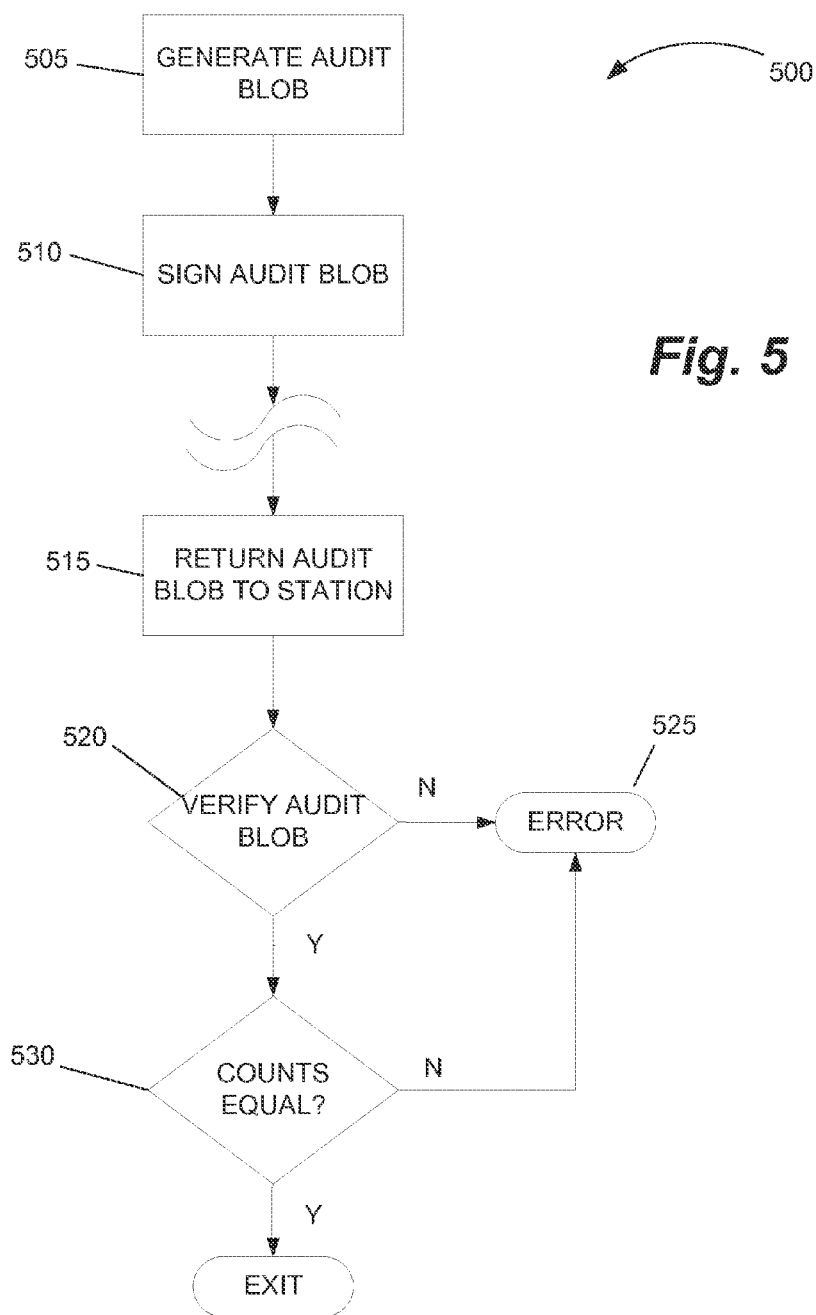
FIG. 5 is a flow chart of an embodiment of a process for ensuring a digital certificate was not signed during time periods the manufacturing station should be idle.

FIG. 5 shows an embodiment of a process 500 for verifying that a token 115 has not been used to sign digital certificates of devices 105 without authorization. At the start of a shift, the token 115 generates an audit blob (step 505). The token 115 then signs the audit blob (step 510) which is maintained in an audit station separate from the manufacturing station 110. At the end of the manufacturing shift, the token 115 is linked to the audit station (step 515). The audit station retrieves (or is sent) the audit blob and verifies the audit blob is valid (step 520). If the audit blob is not valid, an error is flagged (step 525). If the audit blob is valid, the audit station verifies the count of the number of certificates signed by a token 115 as of the end of the manufacturing shift compared to the previous count and the number of devices reported as being manufactured (step 530). If the counts do not match, it is likely unauthorized manufacturing has occurred, and an error is flagged (step 525). Flagging the error identifies the devices 105 signed without authorization, allowing these devices 105 to be disabled in the field.

Figure 6:
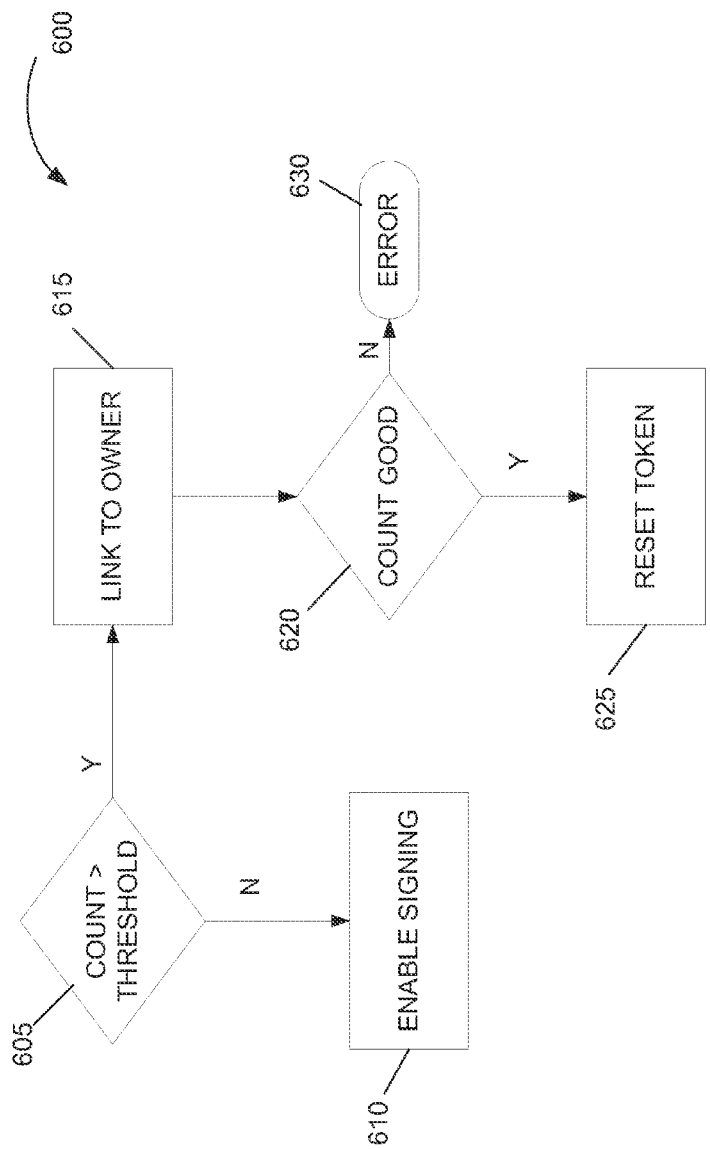
FIG. 6 is a flow chart of an embodiment of a process for resetting a token.

FIG. 6 shows an embodiment of a process 600 for remotely verifying the integrity of a token 115. Prior to signing a digital certificate, the token 115 checks if a threshold has been exceeded (step 605). Thresholds can be based on a quantity of certificates signed, a time span (e.g., a week), or other suitable limit. If the threshold is not exceeded, the token 115 is able to continue to sign certificates (step 610).

If the threshold was exceeded, the token 115 will not sign further certificates until it is reset. The token 115 is linked to the owner (or issuing authority) (step 615). The manufacturing station 110 can perform the linking or the token 115 can be removed from the manufacturing station 110 and coupled to a separate reader. The owner obtains the quantity of certificates signed by the token 115, and checks the quantity against an expected quantity (step 620). If the quantity is acceptable, the owner resets the token 115 (step 625). Resetting the token 115 may involve resetting the threshold (e.g., setting the next end date) or resetting a counter. The token 115 can then be used with the manufacturing station 110 to sign additional digital certificates.

If the quantity was not acceptable, an error is indicated and the token 115 is disabled (step 630). Reasons the quantity may be deemed unacceptable include too many certificates signed during a time period, more certificates signed than the owner is compensated for, etc.

Thus, the invention provides an alternative approach allowing for the secure identification and revocation of a known range of devices, rather than to a larger universe of devices. Various features and advantages of the invention are set forth in the following claims.

What is claimed is:

1. A method for signing digital certificates, the method comprising:
   cryptographically coupling a token to a manufacturing station, wherein the token includes a counter representing a number of signed digital certificates and a maximum value for the counter;
   enabling the token based on a personal identification number received by the manufacturing station;
   determining that a value stored in the counter is less than the maximum value;
   in response to determining that the value stored in the counter is less than the maximum value;
   obtaining a public key from an electronic device,
   binding the public key to a digital certificate that is currently unsigned,
   determining that a serial number associated with the digital certificate matches a serial number associated with a serial number tracker in the token, and
   in response to determining that the serial number associated with the digital certificate matches the serial number associated with the serial number tracker in the token,
   signing the digital certificate with the public key;
   modifying the serial number in the serial number tracker to the next serial number expected;
   incrementing the counter following the signing of the digital certificate; and
   returning the signed digital certificate to the electronic device.

2. The method of claim 1, wherein enabling the token includes verifying that the personal identification number received by the manufacturing station matches a personal identification number stored in the token.

3. The method of claim 1, further comprising linking the token to the manufacturing station.

4. The method of claim 3, further comprising verifying that the token is cryptographically coupled to the manufacturing station to which the token is linked.

5. The method of claim 4, further comprising disabling the token when the token is coupled to a manufacturing station that is different than the manufacturing station to which the token is linked.

6. The method of claim 1, further comprising disabling the token when a trusted platform module of the manufacturing station is not valid.

7. The method of claim 1, further comprising providing to an external device a listing of the digital certificates previously signed.

8. The method of claim 7, further comprising signing the serial number in the serial number tracker when the digital certificate is signed.

9. The method of claim 8, further comprising:
   comparing the listing to a previous listing to determine if unauthorized manufacturing occurred; and
   flagging the certificates of electronic devices manufactured without authorization.

10. The method of claim 1, further comprising determining that the token was issued to the manufacturing station.

* * * * *